UNITED STATES PATENT OFFICE.

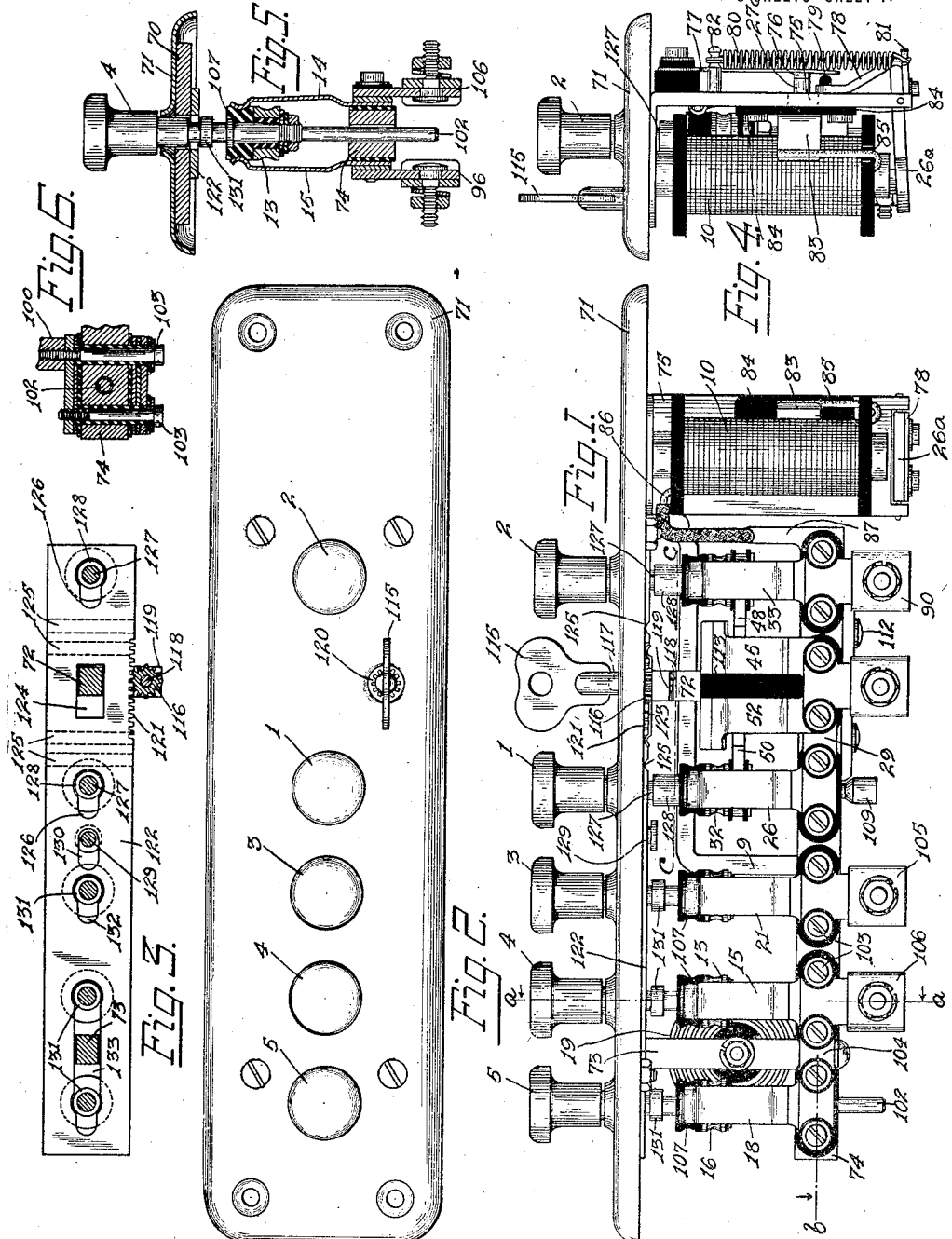

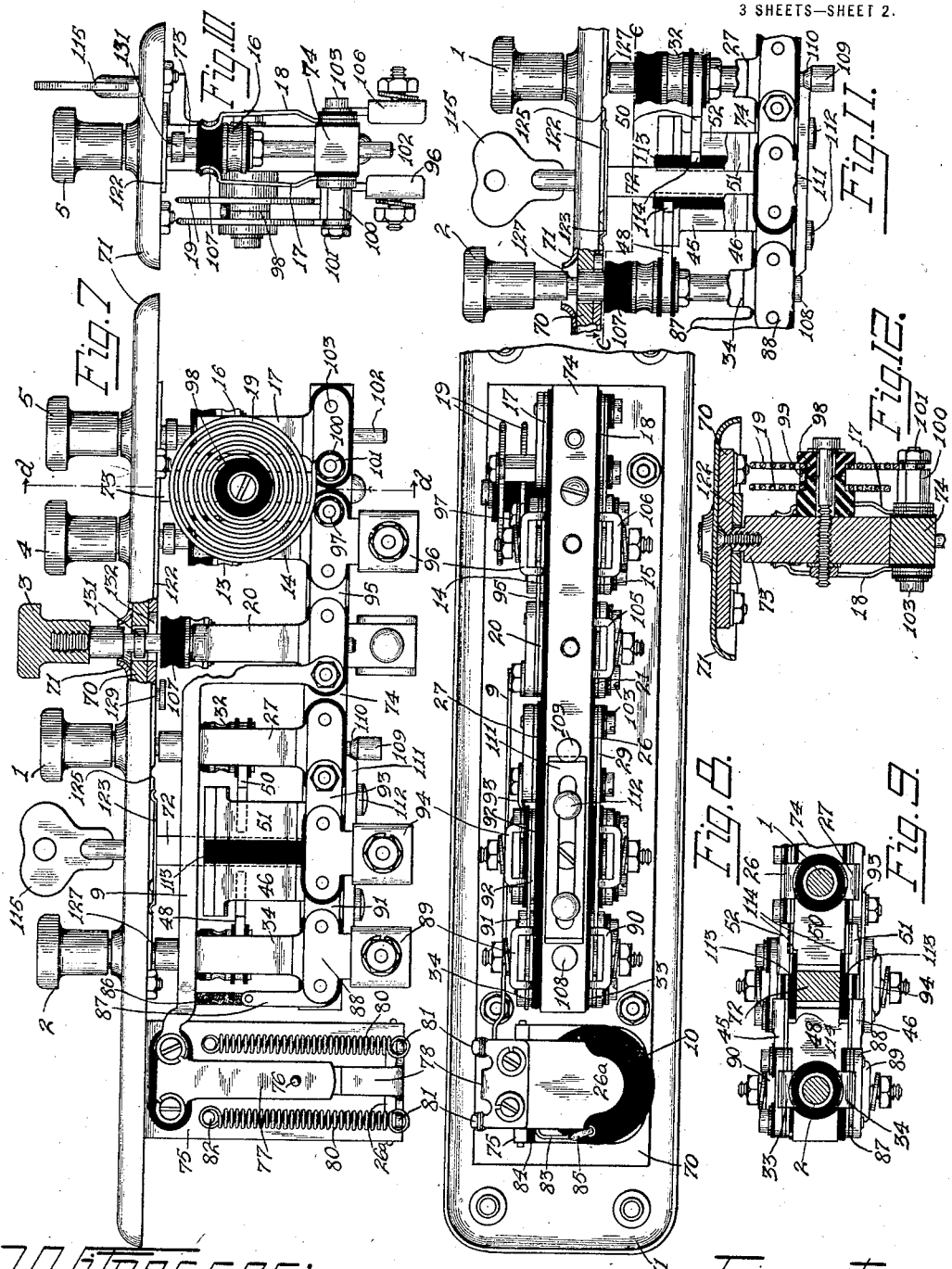

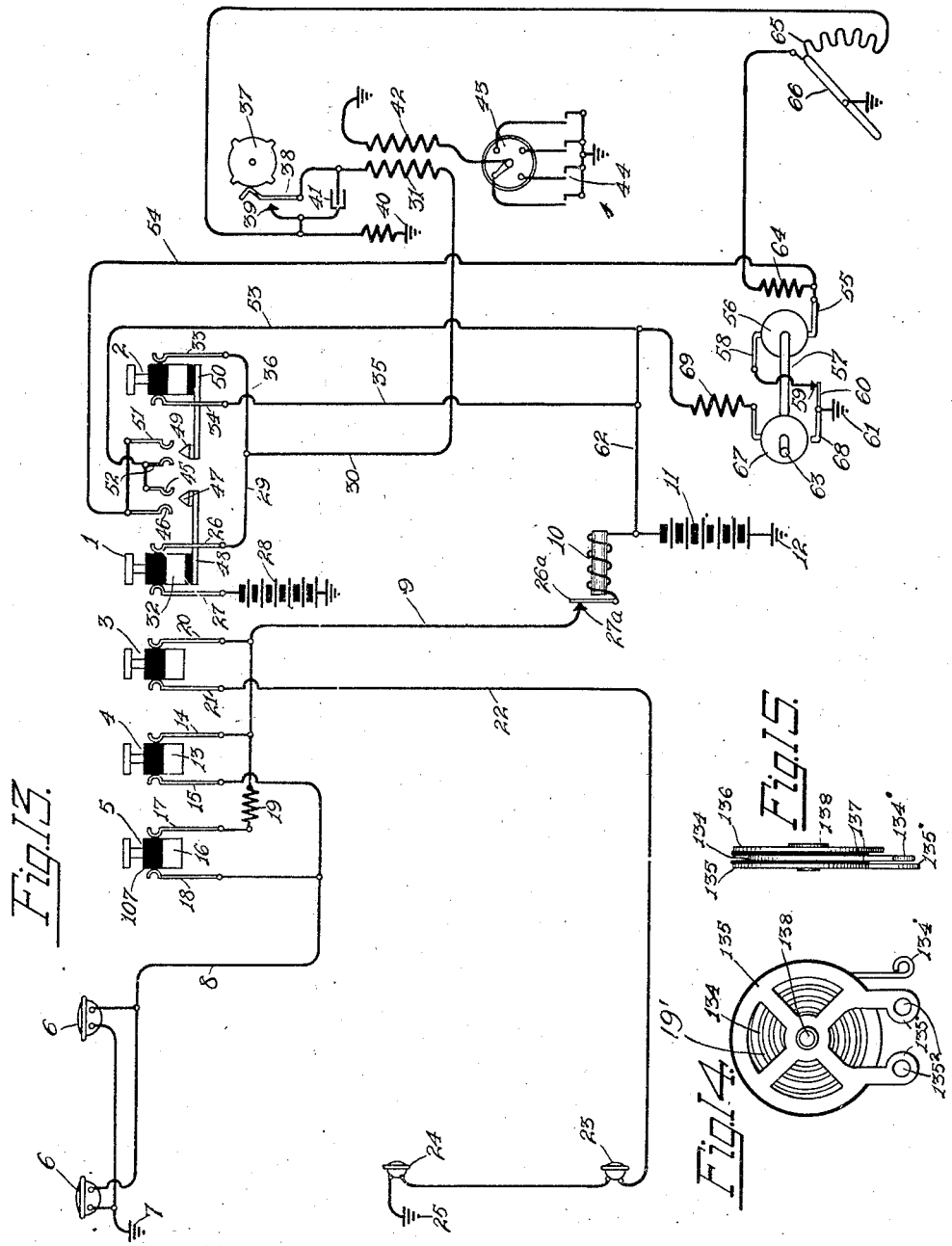

WILLIAM KAISLING, OF CHICAGO, ILLINOIS, ASSIGNOR TO KELLOGG SWITCHBOARD & SUPPLY COMPANY, OF CHICAGO, ILLINOIS, A CORPORATION OF ILLINOIS.

COMBINATION IGNITION AND LIGHTING SWITCH.

1,294,342.

Specification of Letters Patent. Patented Feb. 11, 1919.

Application filed May 6, 1914. Serial No. 836,603.

*To all whom it may concern:*

Be it known that I, WILLIAM KAISLING, a citizen of the United States of America, residing at Chicago, in the county of Cook and State of Illinois, have invented certain new and useful Improvements in Combination Ignition and Lighting Switches, of which the following is a specification.

My invention relates to combination ignition and lighting switches, and has for its object the provision of an improved switch of this character having interlocking features to control the various operations. The switch in the form herein shown is designed to effect control of the lighting system of an automobile and is designed at the same time to effect control over the ignition circuits.

In the form in which the device is herein shown as applied it is used in connection with a storage battery and a dry battery, which may be alternately used for the ignition circuit and in which likewise a motor generator is utilized at times for starting the engine of the automobile, and at times for charging the storage battery. The device is so arranged that the ignition circuit can be connected to but one of the batteries at a time.

My improved switch also has devices whereby the various lighting circuits of the automobile may be served from the storage battery and independently controlled, and also has provision for dimming certain of the lights of the automobile.

My improved switching device further has interlocking features whereby whenever the switch is locked so that neither ignition circuit can be closed, the lamp circuit control devices are also locked to prevent tampering. Interlocking features are provided between the two devices controlling the ignition circuit.

My improved switching device also has an alarm mechanism so arranged as to give an indication should there be an unusual drain of current from the storage battery which may be caused by a ground possibly of some part of the lighting circuit.

I will explain this particular form aforesaid of my invention more particularly in connection with the accompanying drawings illustrating the same, and this particular manner of its use.

Figure 1 is a side view of my improved combination switch;

Fig. 2 is a top view thereof;

Fig. 3 is a detail view of one of the interlocking devices;

Fig. 4 is an end view of my improved device as shown in Fig. 1;

Fig. 5 is a sectional view on line *a—a* of Fig. 1;

Fig. 6 is a fragmentary sectional view on line *b* of Fig. 1;

Fig. 7 is a side view of the device looking at it in the opposite direction to that of Fig. 1, portions being broken away to more clearly reveal features of construction;

Fig. 8 is a bottom view of the device shown in Fig. 1;

Fig. 9 is a sectional view on line *c—c* of Fig. 1;

Fig. 10 is an end view of the device shown in Fig. 1, looking in the opposite direction to that of Fig. 4;

Fig. 11 is a partial side view looking at the same side as Fig. 7, certain parts being removed and portions being broken away to more clearly reveal structural details;

Fig. 12 is a partial sectional view on line *d—d* of Fig. 7;

Fig. 13 is a diagrammatic view illustrating the circuit arrangements, and

Figs. 14 and 15 are modified forms of resistance.

I will explain first of all the diagrammatic circuit arrangement of Fig. 13 as the understanding of the operation of the device will probably be more intelligible after one form of its use as herein illustrated is understood.

Referring thus more particularly to Fig. 13, I show a plurality of plungers 1, 2, 3, 4 and 5 respectively. I also show a pair of automobile head lights 6, 6. The circuit through the head lights 6, 6 extends from the ground at 7 to the lamps in parallel, conductor 8, through various switching devices as will presently appear, conductor 9, relay 10, storage battery 11, to ground at 12. The lamps 6, 6 as will thus be seen receive their current from the storage battery. The plunger 4 has a conducting element 13 and when this plunger is elevated it closes contact between springs 14 and 15, thereby closing the circuit between conductors 8 and 9. Now whenever the plunger 4 is in the position of Fig. 13, and the plunger 5 elevated, then the conducting element 16 of the plunger 5 closes circuit through springs 17 and 18, thereby establishing a conducting circuit between the conductors 8 and 9 through a dimming resistance 19 however, as illustrated. The plunger 3 by controlling the circuit through the springs 20 and 21 closes the circuit from the battery 11 and conductor 9 to the conductor 22, through the tail light 23, the Cowl light 24, to ground at 25. The relay 10 has an armature 26ª and a back contact 27ª. This relay is so arranged that whenever merely the normal current is supplied to the lamps, this relay remains unoperated. When the current exceeds the amount thus required however then its armature is attracted to be immediately released upon breaking of the circuit however, thus causing this relay armature to chatter, thereby conveying an indication to the operator of the car that there is a ground or other fault on the lamp circuit which needs attention. The plunger 1 controls circuit through springs 26 and 27 to establish a circuit from the battery 28 of dry cells, whose one terminal is grounded, through said springs 26 and 27, conductor 29, conductor 30, to the primary winding 31 of the induction coil for delivering the spark. The circuit through springs 26 and 27 is completed through the insulatingly carried contact element 32. Similarly a plunger 2 through the intermediation of springs 33 and 34 establishes a circuit from the ground 12, through the storage battery 11, conductor 62, conductor 35, springs 34 and 33, conductor 36, conductor 30, to the primary winding 31, from where, as before, this circuit can be completed momentarily by the rotating star wheel 37, through the spring 38, contact 39, to ground at 40. A condenser 41 accommodates for the spark at the contacts. The secondary winding 42 may then be connected in the usual way through a distributer 43 to the various spark plugs 44. The plunger 1 when operated to its alternative position also closes a circuit through the springs 45 and 46, through the agency of an insulatingly carried contact 47 mounted upon an arm 48.

In a similar way plunger 2 through the agency of the contact 49 carried by the arm 50 may close circuit through springs 51 and 52. The springs 45 and 52 are connected together as shown and springs 46 and 51 are connected together as shown, conductor 53 leading away from the first set of springs, and conductor 54 being connected to the second set of springs. Thus whenever either one of the plungers 1 or 2 is actuated circuit is established from conductor 53, to conductor 54, through the brush 55, generator armature 56 of the motor generator 57, brush 58, contact 59, switch arm 60, to ground at 61, to ground at 12, storage battery 11, conductor 62, to conductor 53. Under these conditions the generator being now driven by the engine of the automobile, which although not shown, is connected to the shaft 63, charges the storage battery 11. The field coil 64 of the generator has its circuit completed through a resistance 65, which resistance is controlled by an arm 66 suitably operated by a governor as well understood, the speed of which depends upon the speed of rotation of the engine. The motor part 67 of the motor generator 57 is used to start the engine, and this is done when by means of a suitable foot lever or otherwise the brush 68 is brought into contact with the commutator part of the motor, thereby breaking the circuit of the generator portion 56, at the contacts 59 and 60 and establishing a circuit from the ground at 61, brush 68, motor portion 67, resistance 69, conductor 62, storage battery 11 to ground at 12, thus driving the motor to start the engine, the generator circuit at the same time being open.

As soon as the engine is started the brush 68 may be released and the generator portion may again charge the storage battery. The various operations thus required will be apparent.

Now in a system of this character it is imperative that suitable interlocking features be provided. For instance, it is absolutely necessary that no more than one of the plungers 1 or 2 be in circuit closing position at the same time. It is further imperative that locking means be provided so as to prevent the operation of either of the plungers 1 and 2 whenever the owner leaves the car, and it is likewise necessary that when the car is thus left that the locking elements which lock the plungers 1 or 2 in their inoperative position also lock whichever plunger 3, 4, or 5 is in its operative position so as to prevent tampering with any of the lights of the car. The reason for this is that ordinances usually require the burning of certain lights when a car is standing idle on the streets after dusk, and it is necessary that the lighting circuit established by the owner of the car when it is left be not rendered inoperative.

My improved combination switch which carries all of the plungers together with the interlocking features, the locking features, the dimming resistance, and the relay is set forth in Figs. 1 to 12 inclusive, and has all of this apparatus mounted on a suitable plate 70 whose front portion is covered by a suitable face plate 71. The plate 70 through the agency of distance pieces 72 and 73 carries a metallic strip 74 thus to provide a structure carrying all of the plunger mechanism. The relay 10 through the agency of the L-shaped keeper 75 is mounted upon the plate 70 as shown, which keeper also carries the armature 26ª. Back contact 27ª coöperates with the contact 76 carried by the spring 77 insulatingly mounted on the keeper 75 and is controlled by an arm 78 mounted upon the armature 26ª and movable therewith. An insulating button 79 is interposed between the arm 78 and the spring 77. Retractile springs 80 are secured to extending fingers 81 of the bent part 78 and also to pins 82 secured to the heel piece 75. The contact 27ª is fastened to a conducting plate 83 which is insulatingly mounted upon the strip 84, which conducting plate 83 through the agency of the conductor 85 is connected to one terminal of the electromagnet 10. The contact 27ª of course has no electrical connection with the heel piece 75 passing through an opening therein considerably larger than this contact piece 27ª. The other terminal of the electromagnet is connected by means of the conductor 86 with a conducting strip 87, which conducting strip 87 is electrically connected with the spring 34, a suitable cap plate 88 carrying a binding post 89, being also connected therewith. These parts 34, 87, and 88 are insulatingly mounted upon the strip 74. On the opposite side of the spring 34 the spring 33 is also insulatingly mounted and is provided with a binding post 90. The springs 26 and 27 are also insulatingly mounted on opposite sides of the strip 74, spring 26 being connected by means of the conducting strip 29 with the spring 33. Spring 34 is connected by means of a conducting plate 91 with the springs 46 and 51, which springs 46 and 51 together with the plate 91 are insulatingly mounted upon the rod 74, the lower extremity of the springs 46 and 51 being preferably connected together as shown at 92. Spring 27 is also insulatingly mounted upon the rod 74 and is connected by means of the conducting strip 93 with the binding post 94, the binding post 94 being insulated from the springs 46 and 51. The contact spring 77 is connected by means of the conducting strip 9 with the contact spring 20, these parts being also insulatingly mounted and this spring 20 is connected by means of the conducting strip 95 with the spring 14, the spring 14 being insulatingly mounted and being connected to the binding post 96. The binding post 96 also carries a nut 97 whereto one extremity of the double spring 19 is attached. This double spring 19 represents the two halves of the resistance wire, being wound in two coils about the insulating bushing 98 as more clearly shown in Fig. 1, a cross-piece 99 forming part of the resistance connecting the two halves together as shown. The other terminal of this resistance 19 is connected to the post 100 surmounted by the nut 101. This post and hence the last aforesaid terminal of the resistance is electrically connected with the spring 17, these parts except when stated as being connected together electrically, being insulatingly mounted on the rod 74. The construction and arrangement of these parts in connection with the rod 74 is shown more clearly in Fig. 6 where through an aperture in this bar the spindle 102 of the plunger 5 projects. Insulated screws 103 hold all the parts together, suitable insulating strips being provided as shown to insulate the various parts of the conducting plate from the screws as shown. Springs 15 and 18 are electrically connected together by the strip 104, spring 21 having a binding post 105, and spring 15 having the binding post 106.

It will thus be seen that the plungers by reason of their conducting segments such as 16 may establish a circuit between the springs with which they are associated or break this circuit on account of the insulating cylinders such as 107 surmounting the conducting strips. The plungers 1 and 2 as stated carry the insulatingly mounted strips 48 and 50 respectively which when moving from one position to their alternative position either close the circuit through the springs associated therewith or break the circuit, the relative parts of the devices being more clearly shown in Fig. 11 where the plunger 2 is shown as closing the circuit through the springs 45 and 46, the circuit between springs 51 and 52 being open. The plungers 1 and 2 are each provided with extensions respectively 108 and 109 similar in form each having a tapering section 110 adapted to interlock with a sliding plate 111. The sliding plate 111 is slidably held by the screws 112. The sliding plate 111 is mounted clearly as shown in Figs. 8 and 11, and also has sloping extremities to interlock with the flaring portions 110 at the lower extremities of the plungers 1 and 2.

It will thus be seen that but one plunger can be elevated at a time because, for instance, if plunger 1 is elevated as shown in Fig. 11, the sliding plate 111 is moved to the right and locks the plunger 2 against upward movement. Plunger 1 must therefore first be depressed before plunger 2 can be raised, at which time plunger 1 will be locked against movement. It will thus be seen that current can be taken from but one of the sets of batteries shown in Fig. 13. The springs 45, 46, 51 and 52 rest normally against insulating strips 113, which insulating strips however do not interfere with the movement of the plates 48 and 50 as these plates are notched at 114 as more clearly shown in Figs. 9 and 11. In order to lock the plungers 1 and 2 against any movement thus to retain them both in their inoperative position whenever the owner leaves the car, I provide the key 115 carrying the pinion 116 and having a hollow rounded interior as shown at 117. This key is adapted to fit over the stem 118 fixedly mounted in a bracket 119 carried by the strut 72. The plate 70 has an opening 120 of the size exactly to accommodate the gear wheel 116 so that only this particular key 115 can be inserted through the opening 120. When the key is inserted however to a position lower than that of the teeth forming the outline of the opening 120, this key may be rotatable upon the spindle 118 as it is then clear of the teeth forming the outline of the opening 120 and this gear wheel 116 at that time engages the teeth 121 of a rack forming part of the sliding plate 122.

It will thus be seen that after the key is inserted it can be turned to slide this plate 122 from one to the other of its limiting positions, and this plate is held in its limiting positions by a spring 123 fixed between the strut 72 and a projection upon the plate 70, which projection is accommodated for by a suitable opening 124 in the plate 122. This spring 123 has rounded extremities to engage notches 125 provided in this plate to accommodate the spring when the said plate is in either one or the other of its limiting positions. This sliding plate 122 has openings 126 restricted in size at their left hand extremities so that when this plate is moved to the right (Fig. 3,) the restricted portion will inclose the stems 127 of the plungers 1 and 2, thus preventing the plungers 1 and 2 from moving upwardly on account of the collars 128 shown in Fig. 1, which collars 128 are of such size that they can pass upwardly only if the enlarged portions of the openings 126 are presented for their movement therethrough.

It will thus be seen that the key 115 by moving the plate 122 can lock both plungers 1 and 2 against movement. A stud 129 accommodated within a slot 130 limits the movement of the plate 122 from one limiting position to the other. The plate 122 also coöperates with the plungers 3, 4 and 5, it being desirable as already stated that these plungers be locked in whatever position they are left by the owner of the car when he leaves the car and leaves the plungers 1 and 2 locked by sliding the plate 122 to the right and removes the key.

To accomplish this the plungers 3, 4 and 5 are each provided with collars 131, which collars coöperate with suitable openings 132 and 133 provided within this plate 122. It will be noted that when the plungers are down, as shown in Fig. 2, they are entirely below the plate 122, and as shown in Fig. 7 when these plungers are in their elevated position the collars 131 are entirely above the plate 122. When the plate 122 is in the position shown in Fig. 3 where the plungers 1 and 2 are not locked, then the plungers 3 and 5 may unrestrictedly be moved up or down, but after the plate 122 has been moved to the right, the plungers 3, 4, and 5 are locked in whatever position they occupy either actuated or unactuated. The owner may thus be sure that after he has locked the device to prevent operation of the plungers 1 and 2, and left his lamp circuits the way they should be, that then his lamp circuits cannot be tampered with by the operation of the plungers 3, 4 and 5.

In Figs. 14 and 15 I have illustrated an alternative form of dimmer resistance. The resistance 19′ is made of a helix of wire 134 and serves the same purpose as does the resistance 19. The resistance 19′ is protected by two perforated circular plates 135 and 136. A piece of mica 137, the shape of the plates, is placed between each plate and the helix and a stud 138 passes through the plates and mica, the stud being upset at both ends thus holding the helix of wire securely between the plates. The plates 135 and 136 protect the resistance against being bent when adjustments are necessary on the key. The plate 135 has two extensions 135′, the extensions having openings 135².

To place this alternative form of resistance in operative relation with the dimmer switch, the screws 103 which hold the dimmer switch springs 17, 18 in place pass through the openings 135² and suitable nuts are threaded on the screws 103 to hold the resistance in place. The terminal end 134′ of the resistance is fastened to the post 96 so that when the dimmer switch is in an operative position the current passes through the resistance 134, the stud 138, the plate 135 and then through springs 17 and 18 as is the case when using resistance 19.

From what has been described the combination of my improved device will be readily apparent to those skilled in the art, and it will also be clear that many changes and modifications may be made without departing from its spirit.

Having thus described one form which my invention may take, what I claim as new and desire to secure by Letters Patent is:

1. A device of the character described comprising a pair of circuit controlling elements, interlocking mechanism interposed between said elements whereby but one element may be operatively actuated at any given time, a third circuit controlling element, locking mechanism operable to lock both of said first aforesaid elements against operation in their inoperative position and to simultaneously lock said third element in whichever position it occupies at the time of operation of said locking means, a pair of switching springs, a contact device on one of said circuit controlling elements to control the circuit through said switching springs, a second pair of switching springs, and a contact arm carried by said circuit controlling element and insulated from said first aforesaid contact device adapted to control the circuit through said second pair of switching springs.

2. A device of the character described comprising a plunger, a pair of switching springs, a contact device on said plunger to control the circuit through said switching springs, a second pair of switching springs mounted to the side of said first aforesaid switching springs, and a contact making arm carried by said plunger and insulated from said first aforesaid contact adapted to control the circuit through said second pair of switching springs.

3. A device of the character described comprising a plurality of plungers, a pair of switching springs associated with each plunger, a contact on each plunger adapted to control the circuit through its associated switching springs, a second pair of switching springs for said plungers and mounted respectively to the side of the first aforesaid corresponding pair of switching springs, and a contact arm carried by each plunger and insulated from the first aforesaid contact on said plunger to control the circuit through the second aforesaid pair of corresponding switching springs.

4. A device of the character described comprising a plurality of plungers, a pair of switching springs associated with each plunger, a contact on each plunger adapted to control the circuit through its associated switching springs, a second pair of switching springs for each plunger and mounted respectively to the side of the first aforesaid corresponding pair of switching springs, a contact arm carried by each plunger and insulated from the first aforesaid contact on said plunger to control the circuit through the second aforesaid pair of corresponding switching springs, and interlocking means whereby but one plunger may be actuated at the same time.

5. A device of the character described comprising a plurality of plungers, a pair of switching springs associated with each plunger, a contact on each plunger adapted to control the circuit through its associated switching springs, a second pair of switching springs for each plunger and mounted respectively to the side of the first aforesaid corresponding pair of switching springs, a contact arm carried by each plunger and insulated from the first aforesaid contact on said plunger to control the circuit of the second aforesaid pair of corresponding switching springs, interlocking means whereby but one plunger may be actuated at the same time, and means for simultaneously locking both plungers in their inoperative position.

6. A device of the character described comprising a plurality of plungers, a pair of switching springs associated with each plunger, a contact on each plunger adapted to control the circuit through its associated switching springs, a second pair of switching springs for each plunger and mounted respectively to the side of the first aforesaid corresponding pair of switching springs, a contact arm carried by each plunger and insulated from the first aforesaid contact on said plunger to control the circuit through the second aforesaid pair of corresponding switching springs, interlocking means whereby but one plunger may be actuated at the same time, a third plunger, and locking means for locking both of said first aforesaid plungers simultaneously in their inoperative position, and locking said second aforesaid plunger in whichever limiting position it may occupy.

7. A switch key including a frame work having parallel supporting bars, reciprocatingly actuated plungers extending through said bars, operating buttons secured to one end of said plungers, a pair of contact springs, a movable contact actuated by one of said plungers for controlling a circuit through said contact springs, a second pair of contact springs, a second movable contact actuated by said plunger and adapted to control a circuit through said second pair of switch contacts, a sliding plate secured to one of said bars adjacent the other end of said plungers, and cam stop surfaces for each of said plungers, the cam and stop surfaces of said plungers coöperating with said sliding plate to prevent more than one plunger being operatively reciprocated at a time.

8. A switch key comprising a mounting frame, a pair of plungers supported by said mounting frame, a stationary switching contact, a movable contact carried by one of said plungers for engaging said switching contact, a second switching contact, a second movable contact carried by said plunger and insulated from said aforesaid movable contact adapted to engage said second switching contact, a groove cut in each of said plungers, and a sliding plate supported by said frame work and adapted to coöperate with said plungers in such a manner that when one of said plungers is moved to its operative position said sliding plate is moved into the groove of the other of said plungers thus preventing it from being moved to its operative position.

9. A switch key including a frame work having parallel supporting bars, reciprocatingly actuated plungers extending through said bars, operating buttons secured to one of said plungers, a pair of contact springs, a movable contact actuated by one of said plungers for controlling a circuit through said contact springs, a second pair of contact springs, a second movable contact actuated by said plunger and adapted to control a circuit through said second pair of switch contacts, a sliding plate secured to one of said bars adjacent the other end of said plungers, cam and stop surfaces for each of said plungers, the cam and stop surfaces of said plungers coöperating with said sliding plate to prevent more than one plunger being operatively reciprocated at a time, and a sliding plate secured to another one of said bars for locking said plungers against actuation.

10. A switch key comprising a mounting frame consisting of a pair of parallel bars, a pair of switching devices supported by said frame having normal and operative positions, a relatively stationary contact supported by said mounting frame, a movable contact actuated by one of said switching devices and adapted to engage said stationary contact, a second relatively stationary contact, a second movable contact actuated by said switching device and insulated from said other movable contact and adapted to engage the second of said movable contacts, a groove cut in each of said devices, a sliding member supported by one of said bars and coöperating with the grooves in said devices in such a manner that when one of said devices is moved to its operative position the sliding member is moved into the groove of said other device to prevent it being moved to its operative position.

11. A switch key comprising a mounting frame, a pair of plungers supported by said mounting frame, a stationary switching contact, a movable contact carried by one of said plungers for engaging said switching contact, a second switching contact, a second movable contact carried by said plunger and insulated from said aforesaid movable contact adapted to engage said second switching contact, a groove cut in each of said plungers, a sliding plate supported by said framework and adapted to coöperate with said plungers in such a manner that when one of said plungers is moved to its operative position said sliding plate is moved into the groove of the other of said plungers thus preventing it from being moved to its operative position, and a second sliding plate adapted to coöperate with other grooves cut in said plungers to lock said plungers against actuation.

12. A switch key comprising a mounting frame consisting of a pair of parallel bars, a pair of switching devices supported by said frame having normal and operative positions, a relatively stationary contact supported by said mounting frame, a movable contact actuated by one of said switching devices and adapted to engage said stationary contact, a second relatively stationary contact, a second movable contact actuated by said switching device and insulated from said other movable contact and adapted to engage the second of said movable contacts, a groove cut in each of said devices, a sliding member supported by one of said bars and coöperating with the grooves in said devices in such a manner that when one of said devices is moved to its operative position the sliding member is moved into the groove of said other device to prevent it being moved to its operative position, a second groove cut in each of said devices, and a second sliding member supported by the other of said parallel bars and coöperating with said last mentioned grooves to lock said switching devices against effective operation.

Signed by me at Chicago, county of Cook and State of Illinois, in the presence of two witnesses.

WILLIAM KAISLING.

Witnesses:
B. O'BRIEN,
M. R. ROCHFORD.

Copies of this patent may be obtained for five cents each, by addressing the "Commissioner of Patents, Washington, D. C."